United States Patent [19]
Gentry

[11] Patent Number: 4,574,554
[45] Date of Patent: Mar. 11, 1986

[54] SURFACING METHOD AND APPARATUS

[76] Inventor: Gary L. Gentry, 413 via Corta, Palos Verdes Estates, Calif. 90274

[21] Appl. No.: 499,226

[22] Filed: May 31, 1983

[51] Int. Cl.⁴ .............................................. E04G 21/00
[52] U.S. Cl. ........................................ 52/741; 264/35;
  156/71; 156/91; 52/742; 52/105
[58] Field of Search ................. 52/105, 741, 742, 365,
  52/309.4, 309.8, 743, 371, 746, 309.11; 172/1;
  264/31; 156/71

[56] References Cited
U.S. PATENT DOCUMENTS

| | | | |
|---|---|---|---|
| 3,302,362 | 2/1967 | Lang | 32/309.11 |
| 3,319,391 | 5/1967 | Lutch | 52/365 |
| 3,373,535 | 3/1968 | Lankes | 52/105 |
| 3,811,348 | 5/1974 | Brown | 30/180 |
| 3,886,826 | 6/1975 | Brown | 83/464 |

Primary Examiner—Henry E. Raduazo
Assistant Examiner—Dan W. Pedersen

[57] ABSTRACT

Architect can predetermine desired roof surface contour by means of a plurality of studs secured to a base support. The studs, which may carry extenders, are clipped to the desired roof surface contour. Material is added on the base support to attain this desired roof surface contour. A device such as a laser rotating on an axis defines an imaginary reference plane or cone surface, and a clipper apparatus clips the studs or extenders at a predetermined distance from the imaginary reference surface.

2 Claims, 8 Drawing Figures

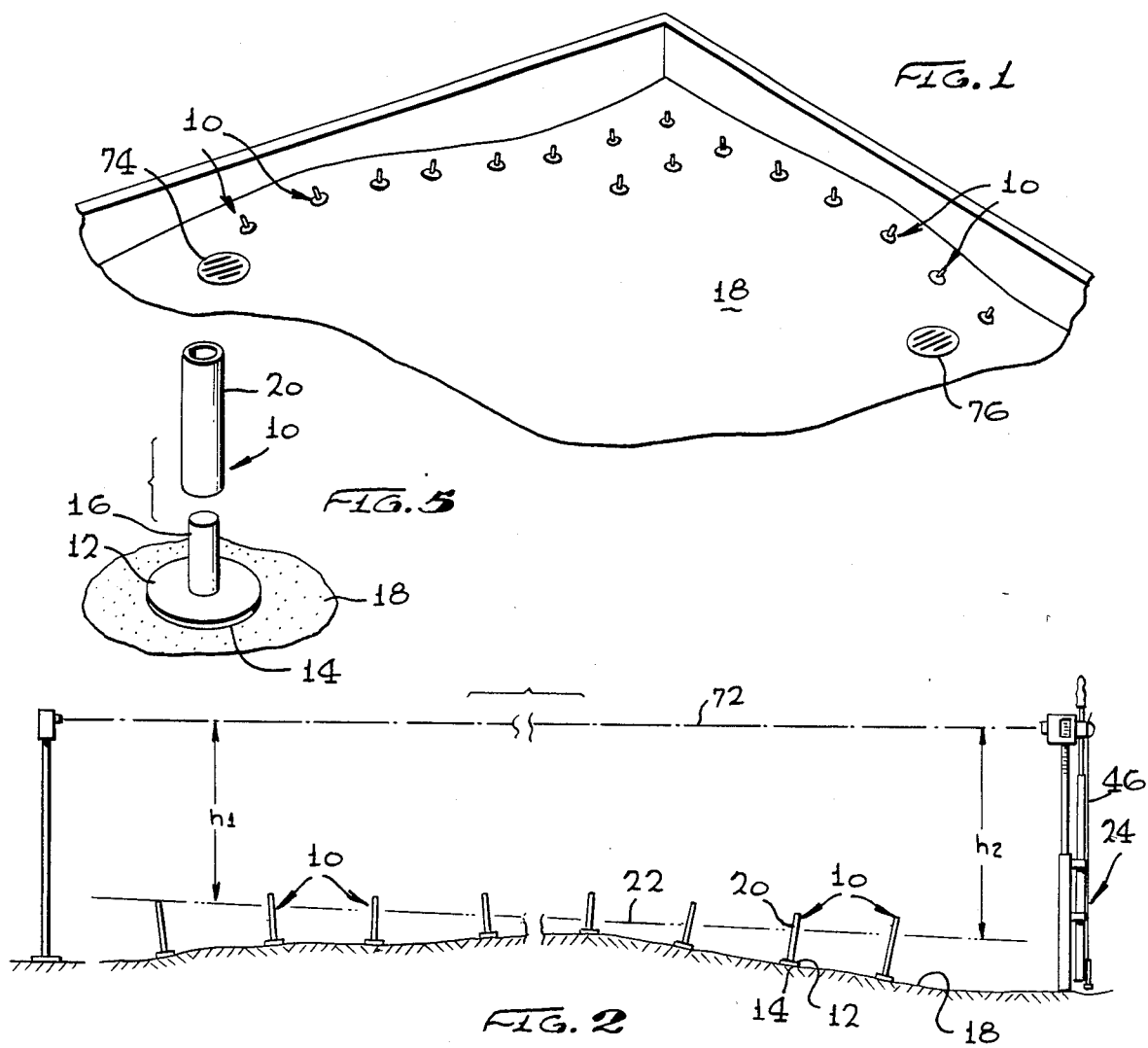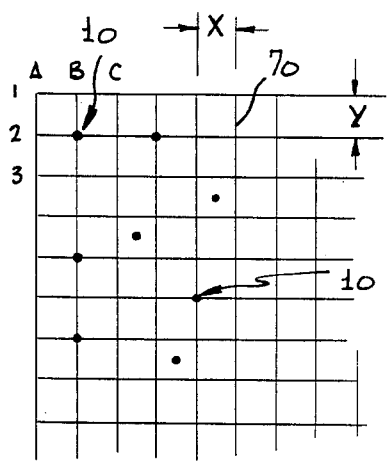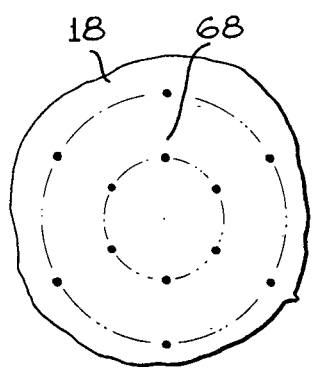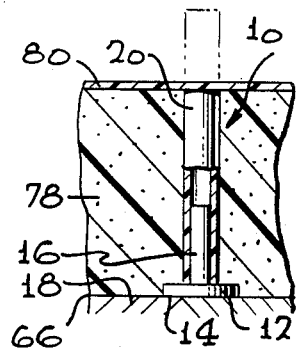

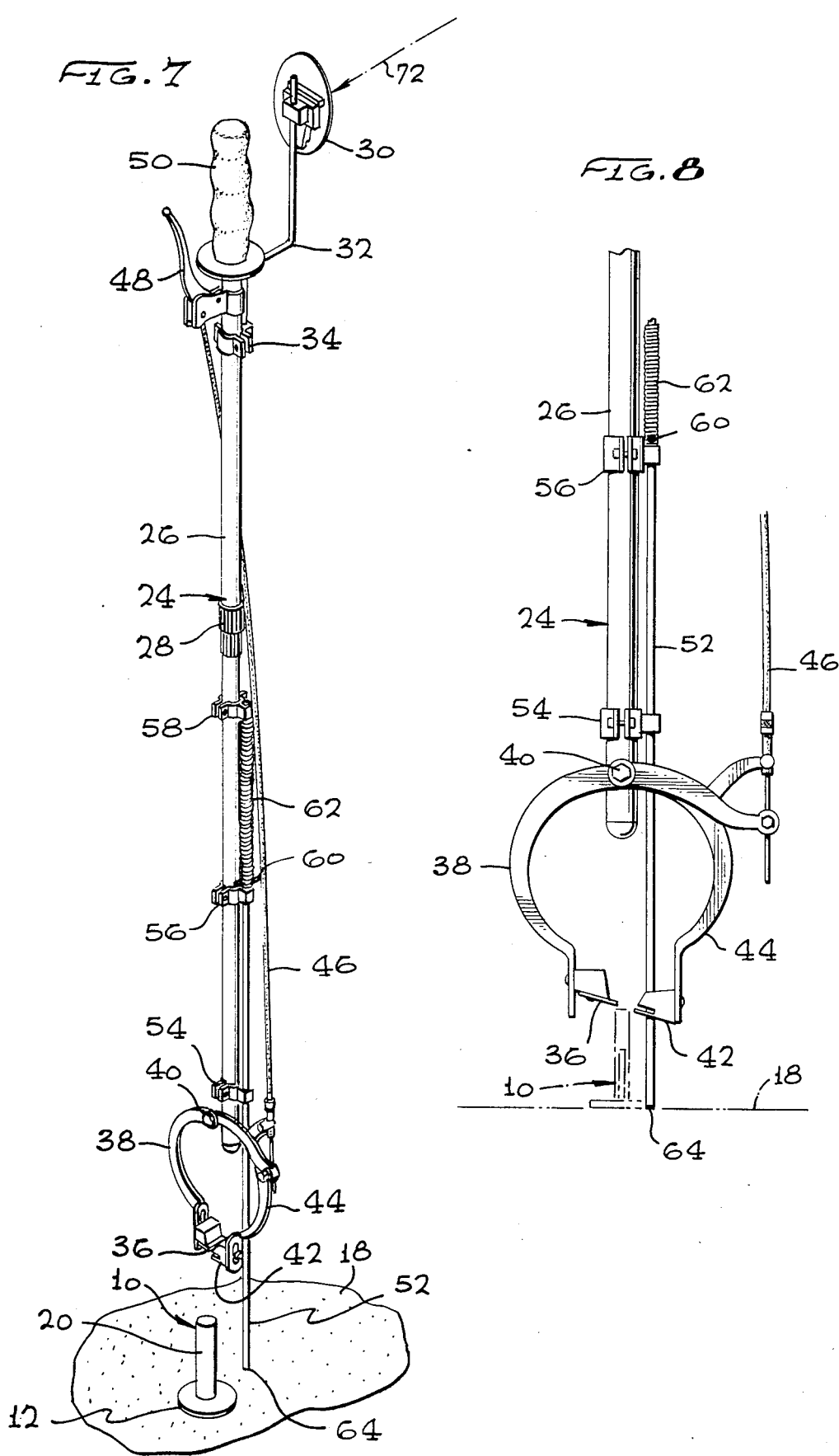

SURFACING METHOD AND APPARATUS

BACKGROUND OF THE INVENTION

This invention is directed to a surfacing method and apparatus by which studs are cut to the desired surface and material is deposited to the top of the studs to achieve material to the desired surface contour.

In quite a number of construction and repair situations, it is desirable to surface or resurface to a desired predetermined contour. There are a number of reasons that a base may not be of the desired surface shape or contour. With cast-in-place floors, the original pouring of the concrete may be rough due to poor placement. On the other hand, the fresh concrete may have been rained upon or frozen to cause the resultant surface to be uneven. In those situations where concrete is poured upon a floor pan, the sagging due to the weight of the concrete causes loss of shape. When precast concrete floors are used, the surface may be away from the desired shape due to problems in the original pouring or problems in the support of the floors. Thus, there is need for an opportunity to rehabilitate such floors to bring them to the desired surface contour. Rehabilitation of concrete and other floor surfaces such as quarry tile, glazed tile, terrazo and wooden floors provide a need for defining a desired surface contour and building up to that contour.

One of the situations in which such surfacing and resurfacing is particularly important is in roofing, both in the original roofing construction and more particularly in resurfacing roofing structures which have sagged or otherwise lost their contours to inhibit drainage. The spraying on of polyurethane which foams in place is used for a wide range of roofing applications. In resurfacing roofs, the proper thickness of the polyurethane foam must be placed in each area in order to achieve the desired finished roof contour, as defined by the architect, while not using excessive material and requiring no rework to repair places where the drainage is not correct. Thus, there is a need for a surfacing method and apparatus whereby these ends can be achieved.

SUMMARY OF THE INVENTION

In order to aid in the understanding of this invention, it can be stated in essentially summary form that it is directed to a surfacing method and apparatus wherein a cuttable stud structure is securable to a base support, and a clipper is provided to refer to an imaginary reference surface and clip the stud structures each individually at a known distance with respect to the imaginary reference surface. The method includes depositing surfacing material to the height of the stud structures so that the material lies at the desired surface contour.

It is, thus an object and advantage of this invention to provide a surfacing method and apparatus whereby material is built up to a desired surface contour, which is defined by the architect and is represented by the tops of stud structures with the stud structures previously cut with respect to an imaginary reference surface at individual distances from the reference surface as previously determined by the architect.

It is a further object and advantage of this invention to provide a stud structure which comprises a stud having a base for securement to the support and an upstanding stud which may be cut to the desired height or with a tube mounted on the stud and extending upward so that the tube can be cut at a desired weight to define the desired surface to which surfacing material is to be placed.

It is another object and advantage of this invention to provide a stud clipper apparatus which has a target near its top and a clipper near its bottom, with the distance therebetween being adjustable so that the clipper is at a selectable position with respect to the target whereby placement of the target on an imaginary reference surface, the clipper can clip off each of the stud structures at an individually predetermined and known distance from the reference surface.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is an isometric view of an uneven base support structure, and particularly an uneven roof, with parts broken away, which needs to be resurfaced to a desired surface contour for proper drainage.

FIG. 2 is a vertical section through an uneven surface showing a device for establishing an imaginary reference surface, a clipper and a plurality of stud structures in accordance with this invention.

FIG. 3 is a plan view of a base support surface to be refinished, showing stud structure in accordance with this invention being positioned on a preselected rectangular grid pattern.

FIG. 4 is similar to FIG. 3, showing the stud structures positioned on polar coordinates.

FIG. 5 is an isometric view of the stud structure of this invention, used in accordance with the method of this invention.

FIG. 6 is a side-elevational view of the stud structure shown secured to a base, and with surfacing material built up to the desired surface contour, with parts broken away and parts taken in section.

FIG. 7 is an isometric view of the clipper apparatus of this invention shown in association with the stud structure.

FIG. 8 is an enlarged detail of the lower portion of the clipper apparatus.

DESCRIPTION OF THE PREFERRED EMBODIMENT

The stud structure which is part of this invention and is used accordance with the method of this invention is generally indicated at 10 in FIGS. 1, 2, 3, 5, 6, 7 and 8. The stud structure 10 has a base 12 which has a flat bottom 14, see FIG. 6. The base is preferably in the form of a flat right circular cylinder, but can be of other generally flat configuration if desired. Stud 16 is a rod which is upstanding on base 12. Stud 16 is preferably cylindrical in exterior configuration and may be integrally formed with base 12. The base is sufficiently broad so that it can be adhesively secured to the base support 18 on which the surfacing material is to be built up to the desired surface contour. The stud 16 can be made of cuttable material and extend sufficiently high to be cut to the desired surface contour. A 1 inch diameter is suitable for the base 12, and a stud 16 should extend upward at least about 1 inch from the bottom of the base. However, extension tube 20 is preferably a part of the stud structure 10. Extension tube 20 has a tubular interior opening large enough so that it can slip downward over stud 16, as shown in FIG. 6. Extension tube 20 is of cuttable material and is provided to be sufficiently long to extend at least up to the desired surface contour 22.

Clipper 24 is indicated at 24 in FIGS. 2, 7 and 8. Clipper 24 has an upright main post 26 which may be telescopically adjustable with the telescoping locking nut shown at 28. Target 30 is secured adjacent the top of main post 26 on rod 32 which is mounted on adjustable mounting bracket 34. Clipper blade 36 is mounted on arm 36 which is pivotably mounted on pivot pin 40. Anvil 42 faces clipper blade 36. Anvil 42 is mounted on arm 44 which is also pivotably mounted on pivot pin 40. Extensions of the arms 38 and 44 are respectively mounted to the wire and sleeve of flexible cable 46. At the upper end, flexible cable 46 has operating handle 48. By squeezing operating handle 48 toward the clipper handle 50 on the top of post 26, the clipper blade is urged toward the anvil to cut off any stud or stud extension tube lying therebetween. The adjustability of the telescoping length of main post 26 and the adjustability of the target with respect to the main post permits the operator to control the distance between the target and the clipper blade. As will become apparent when the method of use of the apparatus is described, that distance is the distance between the imaginary reference surface and the desired surface contour, as determined by the architect for each individual stud structure location.

The target is placed on the imaginary reference surface. In order to aid in this placement and help support the clipper 24, the clipper is provided with a resilient support leg 52, seen in FIGS. 7 and 8. Support leg 52 is a rod which is slidably mounted alongside the main post 26 on guide brackets 54, 56 and 58. Cross pin 60 is secured to support leg 52 and is positioned on top of guide bracket 56 to limit downward motion of the resilient support leg. Compression spring 62 rests on top of cross pin 60 and engages beneath guide bracket 58 so that when the tip 64 is placed on the surface of base 18, the compression force of spring 62 must be overcome to thrust the clipper 24 downward. The resilient support leg, thus, helps to support the clipper and aids in its positioning with the target 30 on the imaginary reference surface.

The clipper 24 and a plurality of stud structures 10 are employed for defining the desired surface contour and the amount of material which is required to bring the base support up to the desired surface contour. When the base is a roof surface 18, as illustrated in FIGS. 1, 3, 4, 5, 6, 7 and 8, first the roof has applied thereto a very thin sealing layer 66, see FIG. 6, of a suitable material such as neoprene. Thereupon, a plurality of the stud structures 10 are secured to the roof base surface, for example adhesively. The plurality of stud structures are secured on a suitable grid defined by the architect. In FIG. 4, the grid 68 is on polar coordinates as for when a conical or domed surface level is desired. In FIG. 3, the grid 70 is on rectangular coordinates is more suitable for use on a rectangular roof such as is shown in FIG. 1. The stud structures are preferably secured to the sealing layer on the base surface on uniform X and Y coordinates as determined by the architect to aid in later calculation. Thereupon, the imaginary reference surface 72 is established. In FIG. 2, the reference plane 72 is shown as established by a suitable surveying instrument 73. In modern surveying, a rotating visible or infrared laser can establish a plane or cone on an axis or slope determined by the architect. This becomes the imaginary reference surface. The architect determines the height, the slope, the conical angle and axis of the imaginary reference surface when he designs the desired roof contour. Then he specifies for each stud structure location the distance from the imaginary reference surface to the cut top of that stud structure to establish the desired roof contour and height. When the surface is established, the clipper 24 is adjusted to the correct height between target 30 and clipper blade 36 for that stud structure. When that is established, then the target 30 is placed on the reference plane and clipper 24 is actuated to clip off extension tube 20 at the predetermined known distance from the imaginary reference surface. When all of the extension tubes 20 are clipped, the tops thereof lie at the desired surface contour.

FIG. 1 illustrates a base roofing surface 18 having 3-dimensional irregularities. It is desired that the finished roof be contoured down to drains 74 and 76. While a plane imaginary reference surface is given in this example, it is clear that a conical surface could be employed to form a desired imaginary reference surface from which the architect can specify the desired roof contour. The architect can specify the shape of the desired roof contour by specifying the distance from the top of each individual stud to achieve that contour. FIG. 1 illustrates the 3-dimensional character of the original base surface, and FIG. 2 illustrates the manner in which a level imaginary plane surface 72 can define a desired sloped surface contour 22 to provide a suitable slope for drainage thereof.

After the extension tubes 20 are clipped and are marked as to their grid positions, they can be removed and taken back to the shop. The height and position of each extension tube is entered into the computer which calculates the volume between the base surface and the desired contour. With this knowledge, the correct amount of the material can be ordered and applied, and the job can be closely bid without planning too much or too little material to fill to the desired surface.

After the calculations, the extension tubes 20 are replaced in their correct position. Thereupon, the surfacing material 78 is sprayed in place. In the preferred example, the surfacing material 78 is a self-foaming polyurethane which is sprayed as a mist, foams in place and thermally sets into a lightweight urethane foam. The spray operator sprays the material so that its finished foam height is even with the height of the many extension tubes 20. Thus, the top level of the surfacing material 78 is free of the dips and settles shown in FIG. 1, but is of the architect specified contour and provides a proper drainage path to the drains. Since the extension tubes 20 are visible until the surfacing material 74 reaches the proper level, the correct amount of surfacing material can easily be achieved.

Finally, sealing layer 80, which is resistant to weather and moisture is applied to complete the surfacing operation. The sealing layer 80 can be applied with the assurance that correct drainage has been achieved. Now, water is sprayed onto the roof to check the drainage. In previous practice, if drainage was not correct, the expensive sealing layer 80 had to be removed for correction of the grade. However, the present surfacing method overcomes the chance that the grade is wrong.

The desired surface level and shape is thus achieved with assurance.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. The method of surfacing a base support to a desired surface contour comprising the steps of:

securing a plurality of stud structures to a base support which is to be surfaced to a desired surface contour, with each of the stud structures comprising a base with an upstanding stud and a cuttable extension tube engaged on the stud and extending upward therefrom above the desired surface;

defining an imaginary reference surface at a known position above the desired surface contour;

cutting the extension tubes at the level of the desired surface contour with a clipper assembly which has a target lying on the reference surface and a clipper at a predetermined distance therefrom at the desired surface contour;

removing the extension tubes;

measuring the extension tubes;

calculating the amount of material required to fill from the base support surface to the desired surface contour;

replacing the extension tubes in their original positions so that the measuring can take place away from the base support; and placing material on the base support to the level of the desired surface contour defined by the cut tops of the extension tubes.

2. The method of surfacing a base support to a desired surface contour comprising the steps of:

securing a plurality of stud structures to a base support in a predetermined geometrical array on the base support which is to be surfaced to a desired surface contour, with each of the stud structures comprising a base with an upstanding stud and a cuttable extension tube engaged on the stud and extending upward therefrom above the desired surface;

defining an imaginary reference surface at a known position above the desired surface contour;

cutting the extension tubes at the level of the desired surface contour with a clipper assembly which has a target lying on the reference surface and a clipper at a predetermined distance therefrom at the desired surface contour;

removing the extension tubes;

measuring the extension tubes;

calculating the amount of material required to fill from the base support surface to the desired surface contour;

replacing the extension tubes in their original positions so that the measuring can take place away from the base support; and placing material on the base support to the level of the desired surface contour defined by the cut tops of the extension tubes.

* * * * *